United States Patent
Wan et al.

(10) Patent No.: US 10,782,454 B2
(45) Date of Patent: Sep. 22, 2020

(54) BLACK MATRIX LAYER HAVING MICRO-GROOVES, DISPLAY SUBSTRATE, AND DISPLAY APPARATUS

(71) Applicants: BOE Technology Group Co., Ltd., Beijing (CN); Beijing BOE Display Technology Co., Ltd., Beijing (CN)

(72) Inventors: Jiyu Wan, Beijing (CN); Tonghua Yang, Beijing (CN); Jingjing Jiang, Beijing (CN); He Feng, Beijing (CN); Sikai Zhang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 138 days.

(21) Appl. No.: 16/099,520

(22) PCT Filed: Nov. 15, 2017

(86) PCT No.: PCT/CN2017/111037
§ 371 (c)(1),
(2) Date: Nov. 7, 2018

(87) PCT Pub. No.: WO2019/095130
PCT Pub. Date: May 23, 2019

(65) Prior Publication Data
US 2019/0146124 A1    May 16, 2019

(51) Int. Cl.
*G02B 5/00* (2006.01)
*G02B 5/20* (2006.01)
*B08B 3/10* (2006.01)

(52) U.S. Cl.
CPC ............ *G02B 5/003* (2013.01); *G02B 5/201* (2013.01); *B08B 3/10* (2013.01)

(58) Field of Classification Search
CPC .......... G02B 5/003; G02B 5/201; B08B 3/10; G02F 2001/1316; G02F 1/133512; G02F 1/133514
USPC ......................................... 359/891
See application file for complete search history.

(56) References Cited

U.S. PATENT DOCUMENTS

2005/0190337 A1    9/2005  Park et al.
2016/0077252 A1*   3/2016  Zhang ............... G02F 1/133512
                                                349/42

FOREIGN PATENT DOCUMENTS

| CN | 101813850 A | 8/2010 |
| CN | 202443140 U | 9/2012 |
| CN | 105093692 A | 11/2015 |

(Continued)

OTHER PUBLICATIONS

International Search Report & Written Opinion dated Jul. 26, 2018, regarding PCT/CN2017/111037.

*Primary Examiner* — Jade R Chwasz
(74) *Attorney, Agent, or Firm* — Intellectual Valley Law, P.C.

(57) ABSTRACT

A black matrix layer for defining a plurality of subpixel regions in a display substrate is provided. The black matrix layer includes a micro-groove region having a plurality of micro-grooves spaced apart from each other. A depth of each of the plurality of micro-grooves at least partially extends through a depth of the black matrix layer. At least one of the plurality of micro-grooves has an elongated shape extending along an elongation direction.

14 Claims, 7 Drawing Sheets

(56) References Cited

FOREIGN PATENT DOCUMENTS

| CN | 105467650 A | 4/2016 |
|---|---|---|
| CN | 107145005 A | 9/2017 |

* cited by examiner

US 10,782,454 B2

BLACK MATRIX LAYER HAVING MICRO-GROOVES, DISPLAY SUBSTRATE, AND DISPLAY APPARATUS

CROSS-REFERENCE TO RELATED APPLICATION

This application is a national stage application under 35 U.S.C. § 371 of International Application No. PCT/CN2017/111037, filed Nov. 15, 2017, the contents of which are incorporated by reference in the entirety.

TECHNICAL FIELD

The present invention relates to display technology, more particularly, to a black matrix layer having micro-grooves, a display substrate, and a display apparatus.

BACKGROUND

In a display substrate, metal lines such as data lines, touch electrodes, and common electrode lines are made of metals having high conductivity, which are materials having high light reflectance. Accordingly, a black matrix array is required in a display substrate (e.g., a color filter substrate) to block the light reflection from these metal lines. Typically, a black matrix is made of a black material having low light reflectance, such as carbon, molybdenum, chromium, etc.

SUMMARY

In one aspect, the present invention provides a black matrix layer for defining a plurality of subpixel regions in a display substrate, comprising a micro-groove region having a plurality of micro-grooves spaced apart from each other, wherein a depth of each of the plurality of micro-grooves at least partially extends through a depth of the black matrix layer; and at least one of the plurality of micro-grooves has an elongated shape extending along an elongation direction.

Optionally, elongation directions of adjacent micro-grooves of the plurality of micro-grooves are toward a substantially the same orientation.

Optionally, the elongations directions of the plurality of micro-grooves are substantially parallel to each other.

Optionally, the depth of each of the plurality of micro-grooves substantially extends through the depth of the black matrix layer; and the black matrix layer in the micro-groove region comprises a plurality of black matrix branches alternated with the plurality of micro-grooves.

Optionally, at least one end of at least one of the plurality of micro-grooves is open to one of the plurality of subpixel regions.

Optionally, each of the plurality of micro-grooves is open to at least one of the plurality of subpixel regions.

Optionally, the plurality of subpixel regions comprise a plurality of subpixel regions of a first color; and each of the plurality of micro-grooves is in a region of the black matrix layer defining the plurality of subpixel regions of the first color.

Optionally, the plurality of subpixel regions of the first color are a plurality of white subpixel regions.

Optionally, each of the plurality of micro-grooves has a groove width in a range of approximately 5 µm to approximately 10 µm.

Optionally, adjacent micro-grooves of the plurality of micro-grooves are spaced apart by a distance in a range of approximately 10 µm to approximately 30 µm.

In another aspect, the present invention provides a display substrate comprising a base substrate and a black matrix layer described herein.

Optionally, elongation directions of adjacent micro-grooves of the plurality of micro-grooves are toward a substantially the same orientation.

Optionally, the elongation directions of the plurality of micro-grooves are substantially parallel to each other.

Optionally, the depth of each of the plurality of micro-grooves substantially extends through the depth of the black matrix layer; and the black matrix layer in the micro-groove region comprises a plurality of black matrix branches alternated with the plurality of micro-grooves.

Optionally, at least one end of at least one of the plurality of micro-grooves is open to one of the plurality of subpixel regions.

Optionally, each of the plurality of micro-grooves is open to at least one of the plurality of subpixel regions.

Optionally, the plurality of subpixel regions comprise a plurality of subpixel regions of a first color; and each of the plurality of micro-grooves is in a region of the black matrix layer defining the plurality of subpixel regions of the first color.

Optionally, the plurality of subpixel regions of the first color are a plurality of white subpixel regions.

Optionally, each of the plurality of micro-grooves has a groove width in a range of approximately 5 µm to approximately 10 µm.

Optionally, adjacent micro-grooves of the plurality of micro-grooves are spaced apart by a distance in a range of approximately 10 µm to approximately 30 µm.

Optionally, the display substrate further comprises a color filter layer; wherein the color filter layer comprises a plurality of color filter blocks in at least some of the plurality of subpixel regions.

Optionally, the plurality of subpixel regions comprise a plurality of subpixel regions of a first color; each of the plurality of micro-grooves is in a region of the black matrix layer defining the plurality of subpixel regions of the first color; and the plurality of color filter blocks are absent in the plurality of subpixel regions of the first color.

Optionally, the plurality of subpixel regions of the first color are a plurality of white subpixel regions.

In another aspect, the present invention provides a display apparatus comprising the display substrate described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Figure 1:
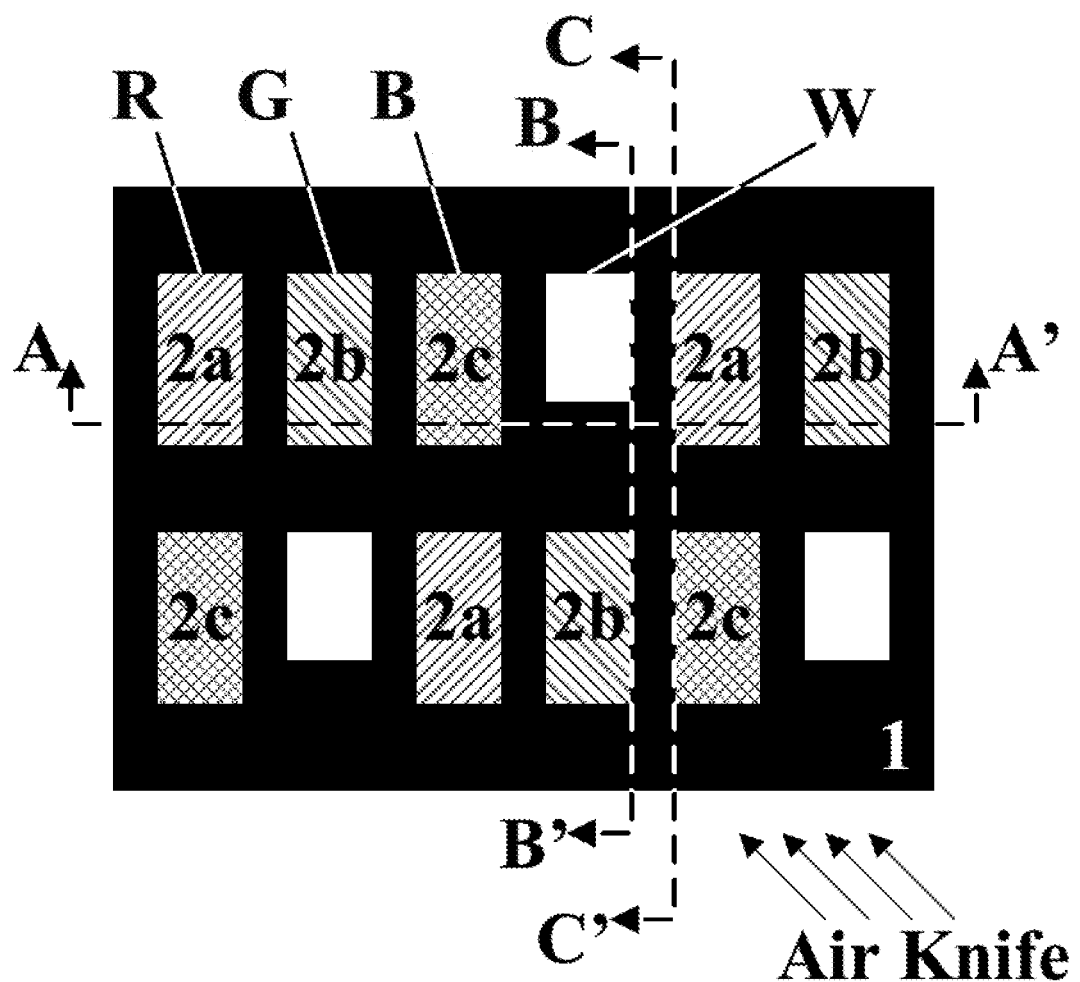
FIG. 1 is a schematic diagram illustrating a cleaning process of a conventional display substrate.
Figure 2:
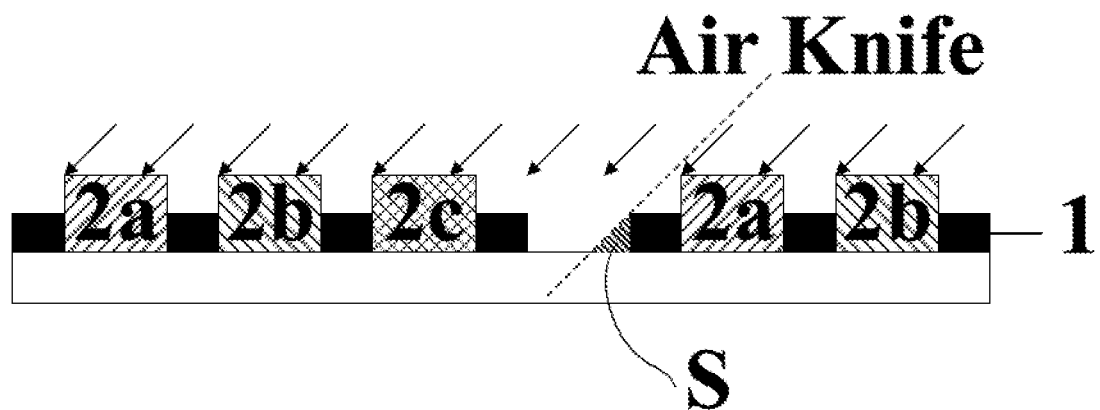
FIG. 2 is a cross-sectional view along line A-A' in FIG. 1.
Figure 3:
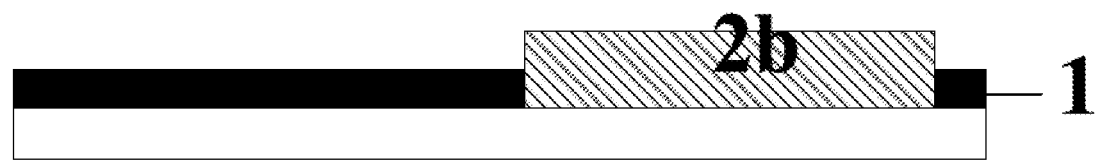
FIG. 3 is a cross-sectional view along line B-B' in FIG. 1.
Figure 4:
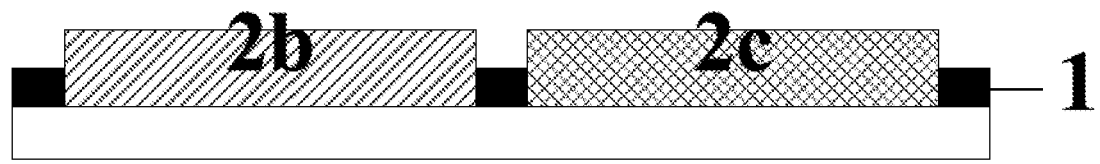
FIG. 4 is a cross-sectional view along line C-C' in FIG. 1.

In one step of the fabrication process of a conventional display substrate (e.g., a color filter substrate), the display substrate is cleaned by a liquid such as water, subsequent to formation of certain layers of the display substrate. The residual water on the display substrate remained after the cleaning process is removed by air from an air knife. FIG. 1 is a schematic diagram illustrating a cleaning process of a conventional display substrate. Referring to FIG. 1, the display substrate is a color filter substrate having a black matrix layer 1 for defining a plurality of subpixel regions, e.g., a red subpixel region R, a green subpixel region G, a blue subpixel region B, and a white subpixel region W. The color filter substrate further includes a color filter having a plurality of color filter blocks, e.g., a red color filter block 2a, a green color filter block 2b, and a blue color filter block 2c. In some color filter substrates, the white subpixel region W does not contain a color filter block. In other color filter substrates, a spacer is disposed in the white subpixel region W. FIG. 2 is a cross-sectional view along line A-A' in FIG. 1. FIG. 3 is a cross-sectional view along line B-B' in FIG. 1. FIG. 4 is a cross-sectional view along line C-C' in FIG. 1. As shown in FIGS. 1 to 4, in some color filter substrates, the white subpixel region W does not contain a color filter block. Thus, a large segment difference between the white subpixel region and adjacent subpixel regions exists.

Referring to FIG. 1 and FIG. 2, during the cleaning process, air from an air knife blows on the display substrate. Due to the segment difference between the white subpixel region and adjacent subpixel regions, the residual water on the display substrate cannot be completely removed, a portion of which remains in a "shadow" region S of the display substrate. During the fabrication process subsequent to the cleaning step, an overcoat layer is to be formed on the surface of the display substrate. Typically, an overcoat material is deposited on the display substrate over the color filter, e.g., by a vapor deposition process. Because the vapor deposition process is performed in a vacuum environment, the residual water in the "shadow" region S evaporates, resulting in bumping. The bumping of the residual water leads to damage in the overcoat layer and eventually formation of white defects in the overcoat layer.

Though most severe in white subpixel regions not having white color filter blocks due to the above-mentioned segment difference, this issue remains in subpixel regions having color filter blocks. Although the pressure and application duration of air from the air knife can be increased to further reduce the amount of the residual water, the "shadow" region S cannot be completely eliminated. Moreover, the increase pressure and duration of air knife procedure inevitably increases the tact time of the substrate and risk of damages caused by the air knife.

Accordingly, the present disclosure provides, inter alia, a black matrix layer having micro-grooves, a display substrate, and a display apparatus that substantially obviate one or more of the problems due to limitations and disadvantages of the related art. In one aspect, the present disclosure provides a black matrix layer for defining a plurality of subpixel regions in a display substrate. In some embodiments, the black matrix layer includes a micro-groove region having a plurality of micro-grooves spaced apart from each other. Optionally, at least one of the plurality of micro-grooves has an elongated shape extending along an elongation direction. Optionally, each of the plurality of micro-grooves has an elongated shape extending along an elongation direction. Optionally, elongation directions of adjacent micro-grooves of the plurality of micro-grooves are toward a substantially the same orientation. Optionally, elongation directions of adjacent micro-grooves of the plurality of micro-grooves are substantially parallel to each other. Optionally, a depth of each of the plurality of micro-grooves at least partially extends through a depth of the black matrix layer. By having this design, the plurality of micro-grooves function as channels for guiding the residual water to flow away (particularly from the "shadow" regions) upon air blow from the air knife. As a result, the residual water on the display substrate can be completely removed by air knife procedure, and the "shadow" region in the display substrate can be completely eliminated.

In some embodiments, elongation directions of all of the plurality of micro-grooves are substantially parallel to each other. In some embodiments, the plurality of micro-grooves includes multiple groups of micro-grooves having elongation directions different from each other. For example, in a first group of micro-grooves, elongation directions of the micro-grooves are toward a substantially the same first orientation, e.g., substantially parallel to each other. In a second group of micro-grooves, elongation directions of the micro-grooves are toward a substantially the same second orientation different from the first orientation, e.g., substantially parallel to each other.

As used herein, the term "substantially the same orientation" in the context of the present disclosure is not limited to scenarios in which elongation directions of adjacent micro-grooves are substantially parallel to each other. The term "substantially the same orientation" encompasses deviations of up to 5 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, or more from a reference elongation direction. Optionally, the term "substantially the same orientation" means the elongation directions of the adjacent micro-grooves deviate from each other by no more than 90 degrees, 80 degrees, 75 degrees, 70 degrees, 65 degrees, 60 degrees, 55 degrees, 50 degrees, 45 degrees, 40 degrees, 35 degrees, 30 degrees, 25 degrees, 20 degrees, 15 degrees, 10 degrees, 5 degrees, or less.

Figure 5:
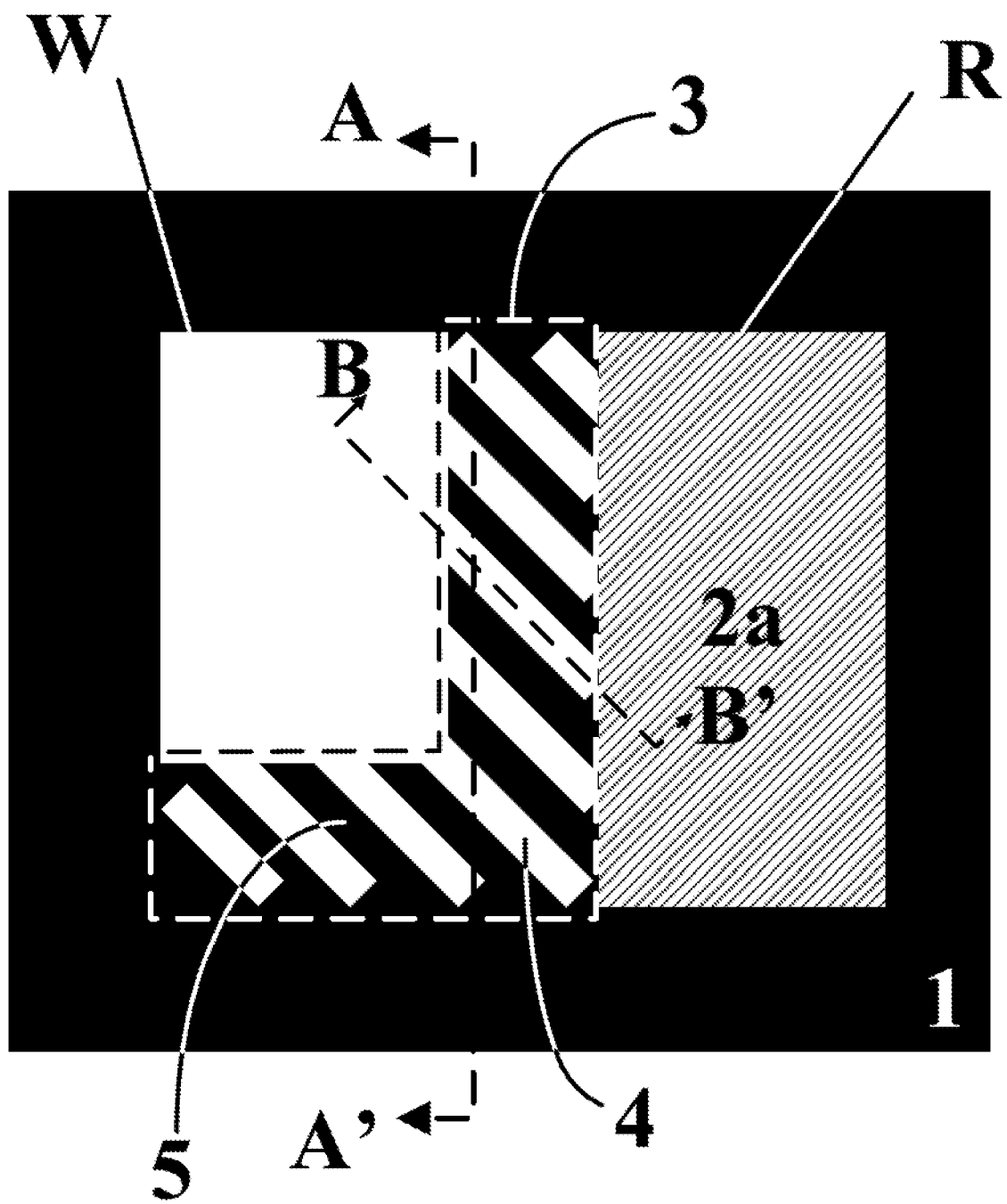
FIG. 5 is a schematic diagram of a black matrix layer in some embodiments according to the present disclosure.

FIG. 5 is a schematic diagram of a black matrix layer in some embodiments according to the present disclosure. Referring to FIG. 5, the black matrix layer 1 in some embodiments includes a micro-groove region 3. In the micro-groove region 3, the black matrix layer 1 includes a plurality of micro-grooves 4 spaced apart from each other. Optionally, as shown in FIG. 5, each of the plurality of micro-grooves 4 has an elongated shape extending along an elongation direction. Elongation directions of adjacent micro-grooves of the plurality of micro-grooves 4 are toward a substantially the same orientation, e.g., the elongations directions of adjacent micro-grooves of the plurality of micro-grooves 4 are substantially parallel to each other, as shown in FIG. 5.

Figure 6:
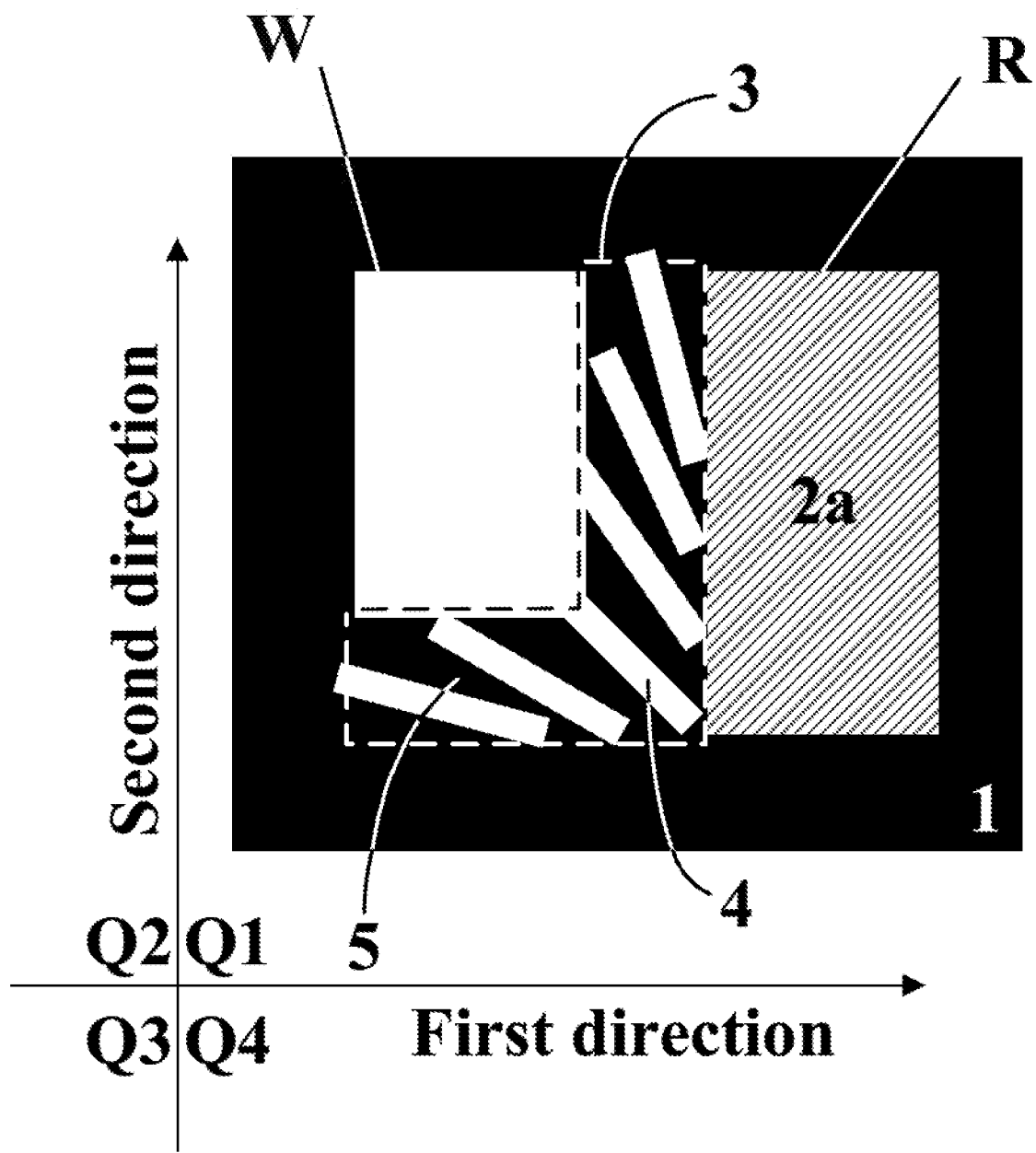
FIG. 6 is a schematic diagram of a black matrix layer in some embodiments according to the present disclosure.

FIG. 6 is a schematic diagram of a black matrix layer in some embodiments according to the present disclosure. Referring to FIG. 6, the elongation directions of adjacent micro-grooves of the plurality of micro-grooves 4 are not parallel to each other, but nonetheless toward a substantially the same orientation. In one example, the black matrix layer is one in a display substrate having a plurality of subpixel regions arranged in an array along a first direction and a second direction. The first direction and the second direction divide a plane of the display substrate into four portions, anti-clock-wisely arranged as Q1, Q2, Q3, and Q4, as shown in FIG. 6. In FIG. 6, the elongation directions of adjacent micro-grooves of the plurality of micro-grooves 4 are all toward a substantially the same orientation, e.g., all along Q2 to Q4 (or along Q4 to Q2). Optionally, the elongation directions of adjacent micro-grooves of the plurality of micro-grooves 4 are all along Q1 to Q3 (or along Q3 to Q1). Though the elongation directions are not parallel to each other, the plurality of micro-grooves 4 adequately function as channel for guiding the residual water on the display substrate to flow away from the "shadow" regions.

Figure 7:
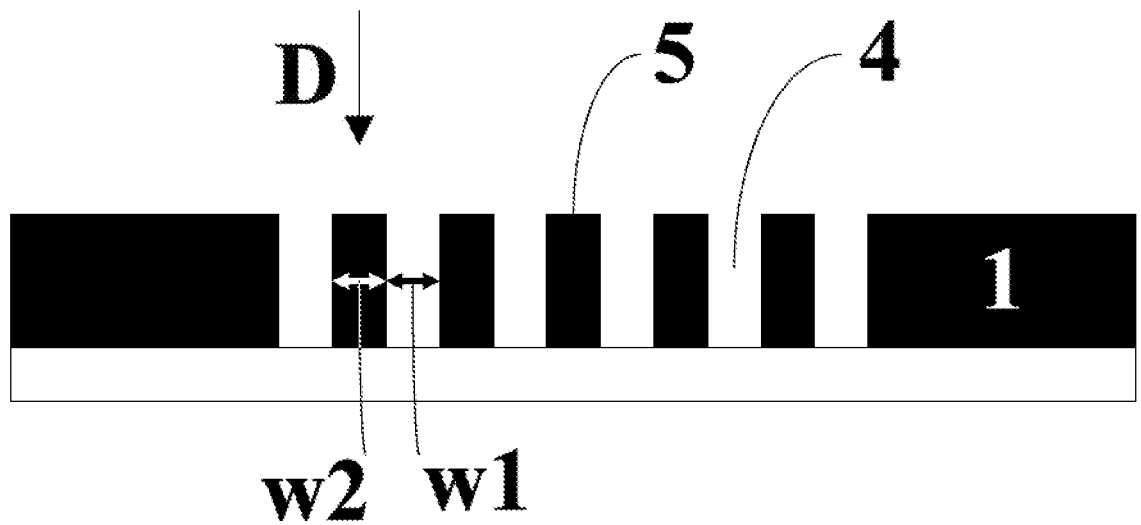
FIG. 7 is a cross-sectional view along line A-A' in FIG. 5 in some embodiments according to the present disclosure.

FIG. 7 is a cross-sectional view along line A-A' in FIG. 5 in some embodiments according to the present disclosure. Referring to FIG. 7, a depth of each of the plurality of micro-grooves 4 substantially extends through the depth of the black matrix layer 1. The depth direction of the black matrix layer 1 is denoted as D in FIG. 7. Referring to FIGS. 5 to 7, the black matrix layer 1 in the micro-groove region 3 includes a plurality of black matrix branches 5 alternated with the plurality of micro-grooves 4.

As shown in FIG. 7, each of the plurality of micro-grooves has a groove width w1. Optionally, the groove width w1 is in a range of approximately 1 µm to approximately 20 µm, e.g., approximately 1 µm to approximately 10 µm, approximately 10 µm to approximately 20 µm, approximately 5 µm to approximately 10 µm, approximately 5 µm to approximately 15 µm, approximately 1 µm to approximately 15 µm, approximately 10 µm to approximately 15 m, approximately 1 µm to approximately 5 µm, approximately 2.5 µm to approximately 5 µm, approximately 5 µm to approximately 7.5 µm, and approximately 2.5 µm to approximately 7.5 µm. As shown in FIG. 7, adjacent micro-grooves of the plurality of micro-grooves 4 are spaced apart by a distance w2. Optionally, the distance w2 is in a range of approximately 10 µm to approximately 100 µm, e.g., approximately 10 µm to approximately 30 µm, approximately 30 µm to approximately 50 µm, approximately 50 µm to approximately 70 µm, approximately 70 µm to approximately 90 µm, and approximately 90 µm to approximately 100 µm.

Figure 8:
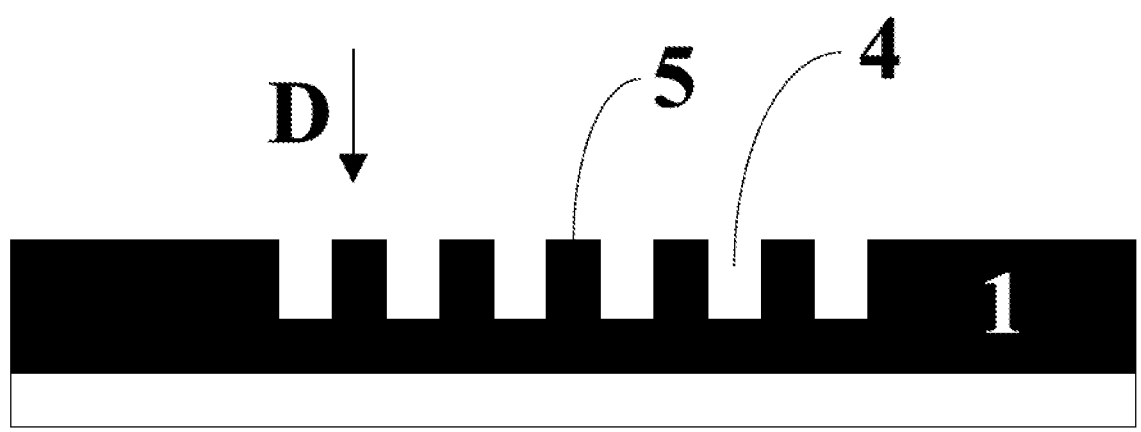
FIG. 8 is a cross-sectional view along line A-A' in FIG. 5 in some embodiments according to the present disclosure.

FIG. 8 is a cross-sectional view along line A-A' in FIG. 5 in some embodiments according to the present disclosure. Referring to FIG. 8, a depth of each of the plurality of micro-grooves 4 only partially extends through the depth of the black matrix layer 1. The depth direction of the black matrix layer 1 is denoted as D in FIG. 8. Referring to FIGS. 5, 6, and 8, the black matrix layer 1 in the micro-groove region 3 includes a plurality of black matrix branches 5 alternated with the plurality of micro-grooves 4.

Figure 9:
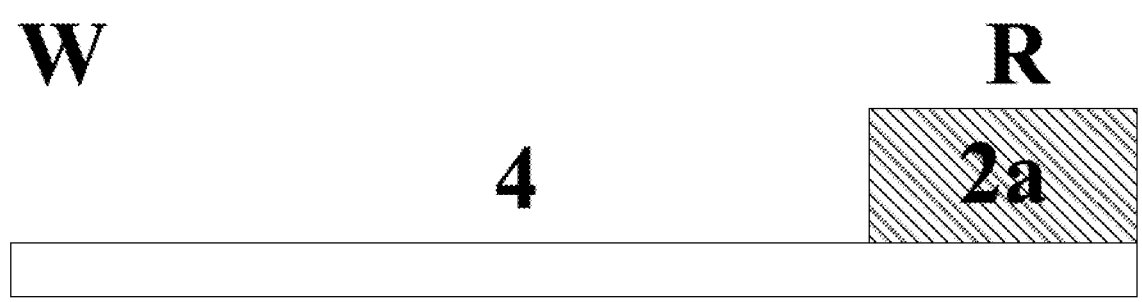
FIG. 9 is a cross-sectional view along line B-B' in FIG. 5 in some embodiments according to the present disclosure.
Figure 10:
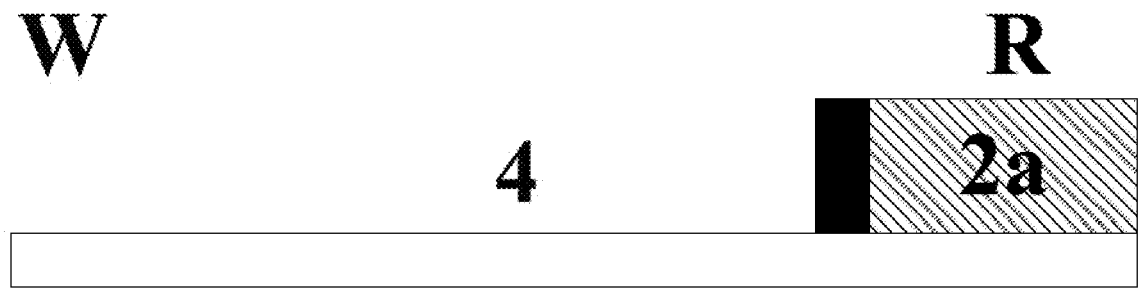
FIG. 10 is a cross-sectional view along line B-B' in FIG. 5 in some embodiments according to the present disclosure.

In some embodiments, at least one end of at least one of the plurality of micro-grooves 4 is open to one of the plurality of subpixel regions. FIG. 9 is a cross-sectional view along line B-B' in FIG. 5 in some embodiments according to the present disclosure. Referring to FIG. 9, the one of the plurality of micro-grooves 4 is open both an adjacent white subpixel region W and an adjacent red subpixel region R. FIG. 10 is a cross-sectional view along line B-B' in FIG. 5 in some embodiments according to the present disclosure. Referring to FIG. 10, the one of the plurality of micro-grooves 4 is open to an adjacent white subpixel region W but not to an adjacent red subpixel region R. Optionally, each of the plurality of micro-grooves 4 is open to at least one of the plurality of subpixel regions.

In some embodiments, at least one end of at least one of the plurality of micro-grooves 4 is not open to any adjacent subpixel region of the plurality of subpixel regions (see, e.g., FIG. 6). Optionally, both ends of at least one of the plurality of micro-grooves 4 are not open to any adjacent subpixel region of the plurality of subpixel regions (see, e.g., FIG. 6).

In some embodiments, the plurality of micro-grooves 4 includes multiple micro-grooves adjacent to subpixel regions having color filter blocks in the subpixel regions (e.g., a red subpixel region R having a red color filter block, a blue subpixel region B having a blue color filter block, and a green subpixel region G having a green color filter block), but not adjacent to subpixel regions without a color filter block (e.g., a white subpixel region W not having a color filter block therein). Optionally, at least one of (e.g., each of) the multiple micro-grooves has at least one end (e.g., both ends) that is not open to any adjacent subpixel region of the plurality of subpixel regions. Optionally, at least one of (e.g., each of) the multiple micro-grooves has a greater depth in the middle of the micro-groove and a smaller depth at the ends of the micro-groove.

In some embodiments, the plurality of subpixel regions includes a plurality of subpixel regions of a first color. Optionally, each of the plurality of micro-grooves 4 is in a region of the black matrix layer 1 defining the plurality of subpixel regions of the first color. Referring to FIG. 5 and FIG. 6, the plurality of subpixel regions defined by the black matrix layer 1 includes at least a white subpixel region W and a red subpixel region R. Each of the plurality of micro-grooves 4 is in a region of the black matrix layer 1 defining the white subpixel region W. By having this design, the "shadow" region formed by the residual water in the white subpixel regions can be effectively eliminated.

Optionally, the plurality of subpixel regions includes one or a combination of a plurality of red subpixel regions, a plurality of green subpixel region, a plurality of blue subpixel regions, and a plurality of white subpixel regions. Optionally, each of the plurality of micro-grooves 4 is in a region of the black matrix layer 1 defining the red subpixel region R. Optionally, each of the plurality of micro-grooves 4 is in a region of the black matrix layer 1 defining the green subpixel region. Optionally, each of the plurality of micro-grooves 4 is in a region of the black matrix layer 1 defining the blue subpixel region. Optionally, each of the plurality of micro-grooves 4 is in a region of the black matrix layer 1 defining two or more of the red subpixel region R, the green subpixel region, the blue subpixel region, and the white subpixel region. Optionally, the plurality of micro-grooves 4 are in a region of the black matrix layer 1 defining all subpixel regions.

Figure 11:
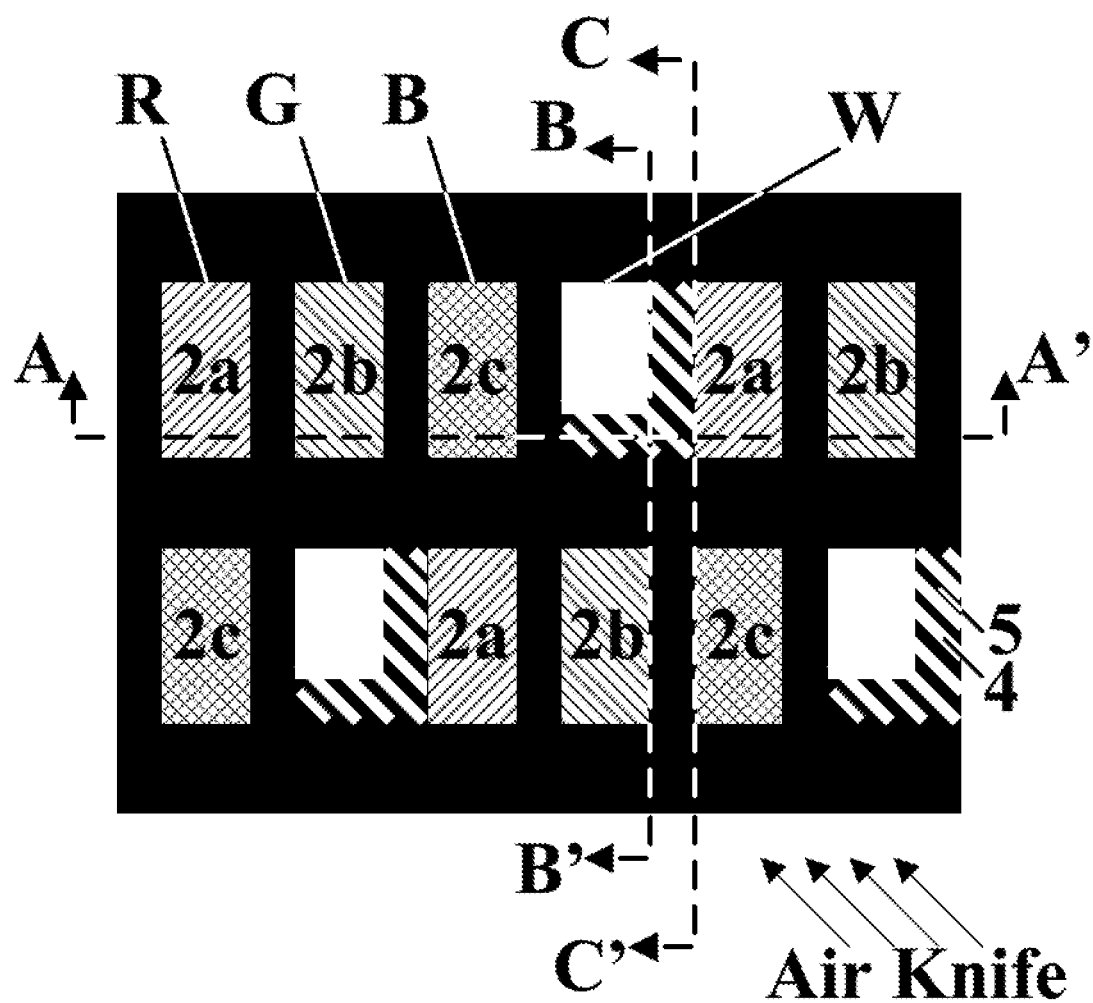
FIG. 11 is a schematic diagram of a display substrate in some embodiments according to the present disclosure.
Figure 12:
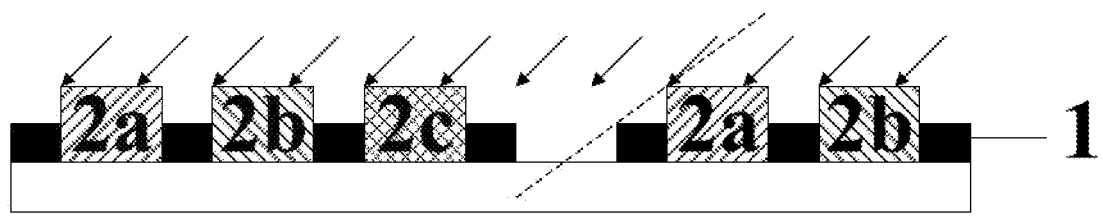
FIG. 12 is a cross-sectional view along line A-A' in FIG. 11 in some embodiments according to the present disclosure.
Figure 13:
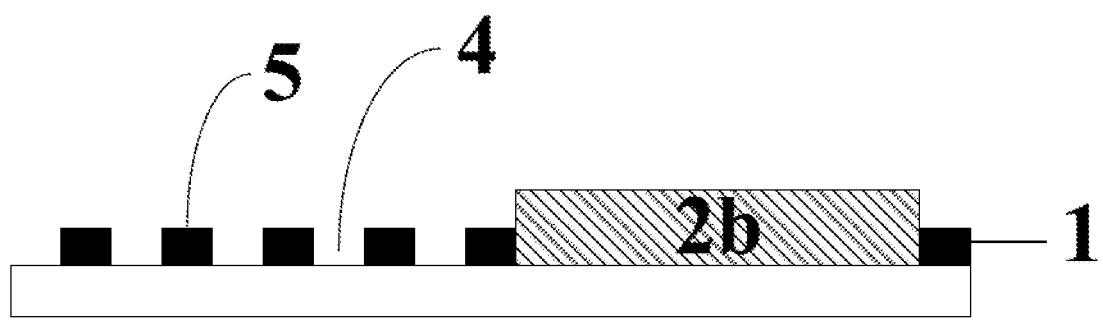
FIG. 13 is a cross-sectional view along line B-B' in FIG. 11 in some embodiments according to the present disclosure.
Figure 14:
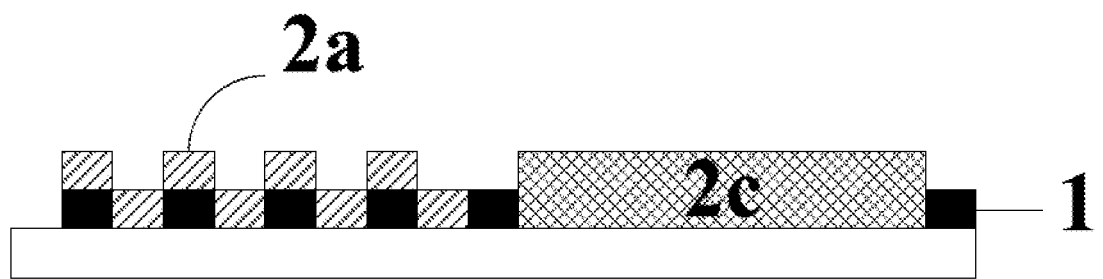
FIG. 14 is a cross-sectional view along line C-C' in FIG. 11 in some embodiments according to the present disclosure.

In another aspect, the present disclosure provides a display substrate having a base substrate and a black matrix layer as described herein on the base substrate. FIG. 11 is a schematic diagram of a display substrate in some embodiments according to the present disclosure. FIG. 12 is a cross-sectional view along line A-A' in FIG. 11 in some embodiments according to the present disclosure. FIG. 13 is a cross-sectional view along line B-B' in FIG. 11 in some embodiments according to the present disclosure. FIG. 14 is a cross-sectional view along line C-C' in FIG. 11 in some embodiments according to the present disclosure. Referring to FIGS. 11 to 14, the display substrate in some embodiments includes a base substrate 10 and a black matrix layer 1 on the base substrate. In some embodiments, the display substrate is a color filter substrate having a color filter layer including a plurality of color filter blocks. As shown in FIG. 1, the color filter layer in some embodiments include a plurality of red color filter blocks 2a in the red subpixel regions R, a plurality of green color filter blocks 2b in the green subpixel regions G, and a plurality of blue color filter blocks 2c in the blue subpixel regions B. Optionally, the display substrate does not include any color filter blocks in the white subpixel regions W, e.g., color filter blocks are absent in the white subpixel regions W.

As shown in FIGS. 11 to 14, the black matrix layer 1 of the display substrate in some embodiments includes a micro-groove region 3, in which the black matrix layer 1 includes a plurality of micro-grooves 4 spaced apart from each other. Each of the plurality of micro-grooves 4 has an elongated shape extending along an elongation direction. Elongation directions of adjacent micro-grooves of the plurality of micro-grooves 4 are toward a substantially the same orientation, e.g., the elongations directions of adjacent micro-grooves of the plurality of micro-grooves 4 are substantially parallel to each other, as shown in FIG. 11. In some embodiments, each of the plurality of micro-grooves 4 is in a region of the black matrix layer 1 defining the plurality of subpixel regions of the first color, e.g., in a region defining the white subpixel region W.

In another aspect, the present disclosure provides a method of fabricating a display substrate. In some embodiments, the method includes forming a black matrix layer on a base substrate. Optionally, the step of forming the black matrix layer includes forming a micro-groove region having a plurality of micro-grooves spaced apart from each other. Optionally, the micro-groove region is formed so that a depth of each of the plurality of micro-grooves at least partially extends through a depth of the black matrix layer. Optionally, each of the plurality of micro-grooves is formed to have an elongated shape extending along an elongation direction. Optionally, the plurality of micro-grooves are formed so that elongation directions of the plurality of micro-grooves are toward a substantially the same orientation. Optionally, the plurality of micro-grooves are formed so that the elongations directions of the plurality of micro-grooves are substantially parallel to each other. Optionally, the micro-groove region is formed so that the depth of each of the plurality of micro-grooves substantially extends through the depth of the black matrix layer, and the black matrix layer in the micro-groove region is formed to include a plurality of black matrix branches alternated with the plurality of micro-grooves. Optionally, the plurality of micro-grooves are formed so that at least one end of at least one of the plurality of micro-grooves is open to one of the plurality of subpixel regions. Optionally, the plurality of micro-grooves are formed so that each of the plurality of micro-grooves is open to at least one of the plurality of subpixel regions. Optionally, the plurality of subpixel regions include a plurality of subpixel regions of a first color, and each of the plurality of micro-grooves is formed in a region of the black matrix layer defining the plurality of subpixel regions of the first color. Optionally, the plurality of subpixel regions of the first color are a plurality of white subpixel regions. Optionally, each of the plurality of micro-grooves is formed to have a groove width in a range of approximately 5 μm to approximately 10 μm. Optionally, the plurality of micro-grooves are formed so that adjacent micro-grooves of the plurality of micro-grooves are spaced apart by a distance in a range of approximately 10 μm to approximately 30 μm.

In some embodiments, the method further includes forming a color filter layer. Optionally, the step of forming the color filter layer includes forming a plurality of color filter blocks in at least some of the plurality of subpixel regions. Optionally, the step of forming the plurality of subpixel regions includes forming a plurality of subpixel regions of a first color. Optionally, each of the plurality of micro-grooves is formed in a region of the black matrix layer defining the plurality of subpixel regions of the first color, and the plurality of color filter blocks are not formed in the plurality of subpixel regions of the first color. Optionally, the plurality of subpixel regions of the first color are a plurality of white subpixel regions.

In some embodiments, subsequent to forming the black matrix layer and forming the color filter layer, the method further includes cleaning the display substrate having the black matrix and the color filter layer using a liquid, e.g., water. Optionally, the method further includes removing the water from the display substrate using air flow from an air knife. Optionally, the elongation directions of the plurality of micro-grooves are toward a substantially the same orientation, and the air flow from the air knife is applied on the display substrate along the substantially the same orientation. Using the present method, the "shadow" regions due to the residual water on the display substrate can be completely removed.

In some embodiments, the method further includes forming an overcoat layer on the color filter layer and the black matrix layer. Optionally, the step of forming the overcoat layer is performed by a vapor deposition process. Because the residual water on the display substrate is completely removed and the "shadow" regions are completely eliminated by using the present method, the issue of bumping caused by the residual water in the fabrication process of the conventional display substrate is completely obviated. The display substrate fabricated by the present method is substantially free of any white defects in the overcoat layer.

In another aspect, the present disclosure provides a display apparatus having the display substrate described herein or fabricated by a method described herein. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display substrate, comprising:
   a base substrate;
   a black matrix layer on the base substrate and in direct contact with the base substrate, the black matrix layer defining a plurality of subpixel regions in the display substrate;
   a color filter layer on the base substrate and in direct contact with the base substrate; and
   an overcoat layer on a side of the black matrix layer and the color filter layer away from the base substrate, the overcoat layer being over surfaces of the black matrix layer and the color filter layer;
   wherein the black matrix layer comprises a micro-groove region having a plurality of micro-grooves spaced apart from each other;
   a depth of each of the plurality of micro-grooves at least partially extends through a depth of the black matrix layer; and
   at least one of the plurality of micro-grooves has an elongated shape extending along an elongation direction;
   wherein the black matrix layer is in a black matrix region outside the plurality of subpixel regions;
   an orthographic projection of the micro-groove region on the base substrate is non-overlapping with orthographic projections of the plurality of subpixel regions on the base substrate; and
   at least one end of a respective one of the plurality of micro-grooves is open to one of the plurality of subpixel regions;
   wherein the base substrate or a portion of the black matrix layer forms bottoms of the plurality of micro-grooves; and
   openings of the plurality of micro-grooves are facing away from the base substrate.

2. The display substrate of claim 1, wherein elongation directions of adjacent micro-grooves of the plurality of micro-grooves are toward a substantially the same orientation.

3. The display substrate of claim 2, wherein the elongation directions of the plurality of micro-grooves are substantially parallel to each other.

4. The display substrate of claim 1, wherein the depth of each of the plurality of micro-grooves substantially extends through the depth of the black matrix layer; and the black matrix layer in the micro-groove region comprises a plurality of black matrix branches alternated with the plurality of micro-grooves.

5. The display substrate of claim 1, wherein each of the plurality of micro-grooves is open to at least a respective one of the plurality of subpixel regions.

6. The display substrate of claim 1, wherein the plurality of subpixel regions comprise a plurality of subpixel regions of a first color; and
   each of the plurality of micro-grooves is in a region of the black matrix layer defining the plurality of subpixel regions of the first color.

7. The display substrate of claim 1,
   wherein the color filter layer comprises a plurality of color filter blocks in at least some of the plurality of subpixel regions.

8. The display substrate of claim 7, wherein the plurality of subpixel regions comprise a plurality of subpixel regions of a first color;
   each of the plurality of micro-grooves is in a region of the black matrix layer defining the plurality of subpixel regions of the first color; and
   the plurality of color filter blocks are absent in the plurality of subpixel regions of the first color.

9. A display apparatus, comprising the display substrate of claim 1.

10. The display substrate of claim 1, wherein the plurality of subpixel regions comprise a plurality of subpixel regions of a first color, a plurality of subpixel regions of a second color, and a plurality of subpixel regions of a third color;
    the first color, the second color, and the third color are different from each other;
    the plurality of micro-grooves are absent in a first inter-subpixel region between a respective one of the plurality of subpixel regions of the second color and a respective one of plurality of subpixel regions of the third color, the first inter-subpixel region being directly adjacent to the respective one of the plurality of subpixel regions of the second color and the respective one of plurality of subpixel regions of the third color;
    the micro-groove region is directly adjacent to a respective one of the plurality of subpixel regions of the first color.

11. The display substrate of claim 10, wherein the plurality of subpixel regions further comprise a plurality of subpixel regions of a fourth color;
    the first color, the second color, the third color, and the fourth color are different from each other;
    the plurality of micro-grooves are absent in a second inter-subpixel region between the respective one of the plurality of subpixel regions of the third color and a respective one of plurality of subpixel regions of the fourth color, the second inter-subpixel region being directly adjacent to the respective one of the plurality of subpixel regions of the third color and the respective one of plurality of subpixel regions of the fourth color.

12. The display substrate of claim 11, wherein the respective one of the plurality of subpixel regions of the first color is smaller than the respective one of the plurality of subpixel regions of the second color, smaller than the respective one of plurality of subpixel regions of the third color, and smaller than the respective one of plurality of subpixel regions of the fourth color.

13. The display substrate of claim 10, wherein the respective one of the plurality of subpixel regions of the first color has a rectangular shape having a first longitudinal side, a first lateral side connected to the first longitudinal side, a second longitudinal side connected to the first lateral side, and a second lateral side connected to the second longitudinal side;

the micro-groove region is directly adjacent to the first longitudinal side and the first lateral side; and the plurality of micro-grooves are absent in a region directly adjacent to the second longitudinal side is absent in a region directly adjacent to the second lateral side.

14. The display substrate of claim 10, wherein the respective one of the plurality of subpixel regions of the first color is smaller than the respective one of the plurality of subpixel regions of the second color, and smaller than the respective one of plurality of subpixel regions of the third color.

* * * * *